March 5, 1929.  S. S. WHIPPS  1,704,452
CAR TRUCK
Filed Feb. 4, 1928  2 Sheets-Sheet 1
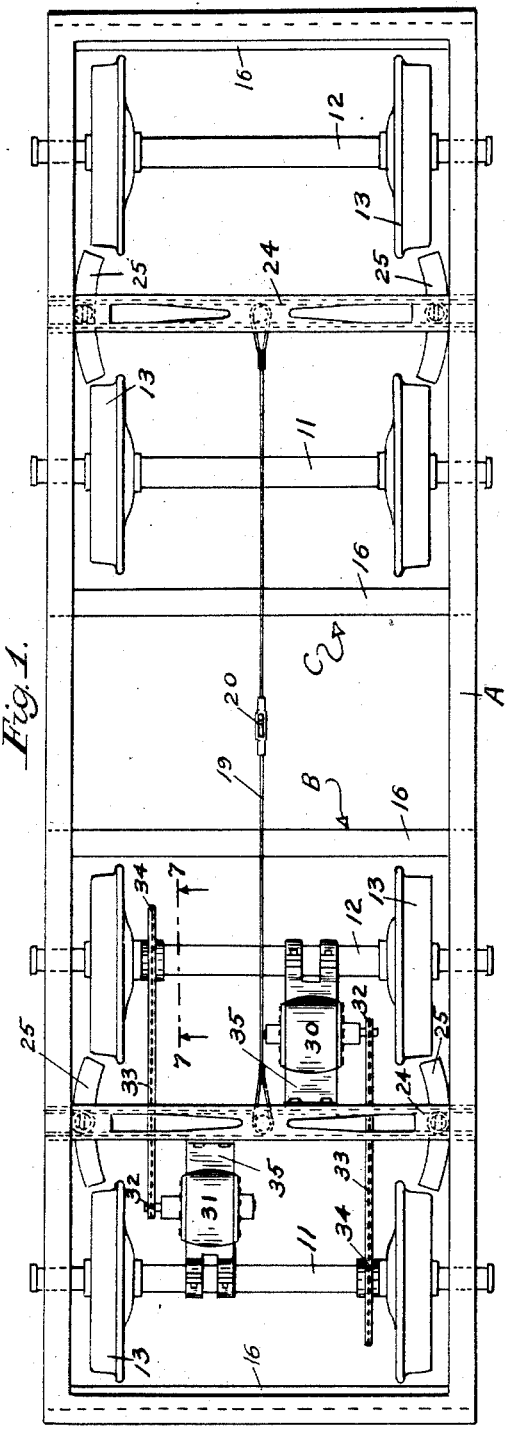
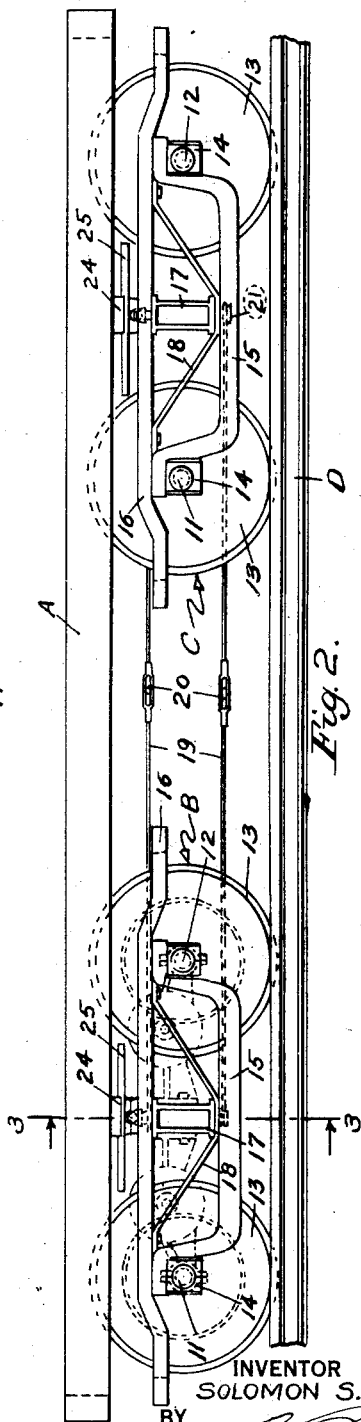
INVENTOR
SOLOMON S. WHIPPS
BY
ATTORNEY March 5, 1929.     S. S. WHIPPS     1,704,452
CAR TRUCK
Filed Feb. 4, 1928     2 Sheets-Sheet 2
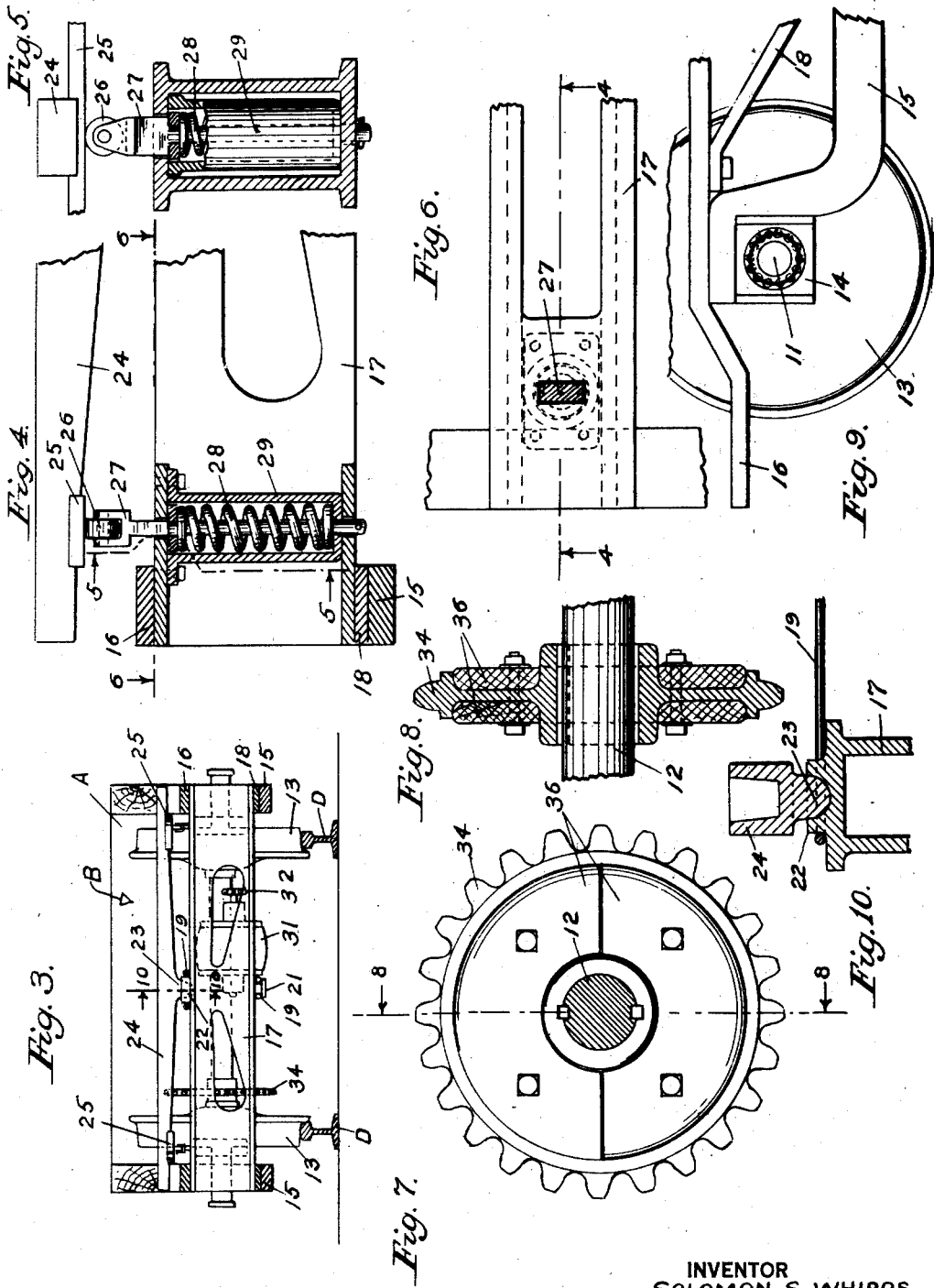
INVENTOR
SOLOMON S. WHIPPS
BY
ATTORNEY Patented Mar. 5, 1929.

1,704,452

UNITED STATES PATENT OFFICE.

SOLOMON S. WHIPPS, OF MINNEAPOLIS, MINNESOTA.

CAR TRUCK.

Application filed February 4, 1928. Serial No. 251,849.

This invention relates to car trucks, such as employed in street cars and railroad cars, and the main object is to provide an efficient, practical and comparatively simple truck construction, that may be operated with a minimum amount of power, that will serve as a proper and yielding support for the superstructure of the car, and which is so constructed that it will eliminate much of the chattering, vibrations, and noises which are incident to the truck structures now commonly in use. Further and more specific objects will be disclosed in the course of the following specification, reference being had to the accompanying drawings, wherein:

Fig. 1 is a plan view of a car sill or frame, and showing my improved truck structures as arranged thereunder.

Fig. 2 is a side elevation of the structure as shown in Fig. 1.

Fig. 3 is a sectional elevation on the line 3—3 in Fig. 2.

Fig. 4 is a sectional elevation on the line 4—4 in Fig. 6.

Fig. 5 is a sectional detail view on the line 5—5 in Fig. 4.

Fig. 6 is an enlarged detail plan view, partly in section, as on the line 6—6 in Fig. 4.

Fig. 7 is an enlarged detail view as on the line 7—7 in Fig. 1.

Fig. 8 is a diametrical, sectional view, on the line 8—8 in Fig. 7.

Fig. 9 is an enlarged detail view of one corner portion of my improved truck structure.

Fig. 10 is an enlarged detail section on the line 10—10 in Fig. 3.

Referring to the drawings more particularly and by reference characters, A designates the sill or main frame of the car, B designates generally the front supporting truck, C the rear supporting truck, and D the rails upon which the car travels. The trucks B and C are substantially identical in construction, except that the power mechanism is applied to the truck unit B. It will be understood, however, that power may be applied to either or both units, although I prefer to apply the driving power to the front truck unit of the car only.

Each truck unit comprises a pair of axles 11 and 12, having integrally formed wheels 13, bearing boxes 14, at the ends of the axles, laterally disposed hanger bars 15, to the ends of which are secured the bearing boxes 14, and a rectangular truck frame 16 which rests upon the ends of the bars 15. A substantially hollowed out cross beam 17 extends transversely of the truck, and is secured with its ends between the adjacent hanger bar and truck frame members 15 and 16. Brace rods 18 also help to strengthen the truck units thus described.

The cross beams 17 of the truck units B and C are connected by a pair of tie rods 19 having turnbuckles 20 for length adjustment purposes. The lower of these rods has loops at its end which rotatably engage studs 21, depending from the cross beams, while the upper tie rod similarly engages lugs 22 projecting upwardly from the beams. The members 21 and 22 are of course concentric with the turning centers, or pivots of the trucks so that the tie rods will be taut at all times.

The lugs 22 are each concavely recessed so as to tiltably and rotatably receive and support the downwardly projecting convexly curved or rounded central lug 23 of a bolster 24. The bolster 24 is provided near its ends with a pair of integral segments 25 that are adapted to contact with and travel or oscillate on a pair of supporting rollers 26 (see Figs. 4 and 5). The rollers 26 are mounted in plunger bars 27 that are slidably mounted in the ends of the cross beams 17. The bars 27 have limited upward movements, but are pressable downwardly against compression springs 28, which operate in suitable chambers 29. The bars 27 are provided with rectangular or non-circular portions, as shown in Figs. 4, 5 and 6, which guide in similarly shaped slots. This prevents turning of the bars and insures proper positioning of the rollers 26 with respect to the segments 25. As the springs 28 support a large part of the normal weight of the car, they are compressed before being put in place, and may only yield when the weight of the car is heavier on one side than the other as when going around a curve or when its load is unevenly distributed. The springs will also of course absorb much of the shock and vibration between the truck units and car body proper.

The driven truck unit, B, is operated by a pair of electric motors 30 and 31, which respectively drive the axles 11 and 12, through sprocket pinions 32, of the motors, sprocket chains 33, and sprocket gears 34 secured on the axles. The motors are mounted on brackets 35, that are secured at their inner ends to the cross beam 17, while their outer ends are secured over the opposite axles of the truck. As shown in Figs. 7 and 8 the gear wheels 34 are provided, upon both sides, with wood or fabricated disk segments 36, which are securely fastened, as by bolts, and which serve to absorb much of the noise and vibration that would otherwise be present.

It is understood that suitable modifications may be made in the general design and structural details of the invention as herein shown, provided, however, that said modifications come within the spirit and scope of the appended claims. Having now therefore fully shown and described my invention, what I claim to be new and desire to protect by Letters Patent is:

1. In a car truck, a frame having a cross beam, and wheel axles mounted in the frame one in front and the other rearwardly of the cross beam, a pair of transversely disposed motors mounted one at each side of the cross beam, and endless flexible members driven by the motors for respectively driving the axles at the opposite sides of the beam.

2. In a car truck, a frame having a cross beam, and wheel axles mounted in the frame one in front and the other rearwardly of the cross beam, a pair of motors mounted one at each side of the cross beam, and sprocket chain drive connections between the motors and axles.

3. In a car truck, a frame having a cross beam, and wheel axles mounted in the frame one in front and the other rearwardly of the cross beam, a pair of motor brackets rigidly secured with their inner ends to the cross beam, and their outer ends to the respective wheel axles, and motors mounted on said brackets with connections for driving the respective axles at the opposite sides of the beam.

In testimony whereof I affix my signature.

SOLOMON S. WHIPPS.